Oct. 30, 1945.    O. L. BRIGHT    2,387,876
CUTTING DEVICE
Filed Aug. 25, 1943

INVENTOR.
OSCAR L. BRIGHT
BY
Lester J. Budlong
ATTORNEY

Patented Oct. 30, 1945

2,387,876

UNITED STATES PATENT OFFICE 2,387,876

CUTTING DEVICE

Oscar L. Bright, Indianapolis, Ind., assignor to United States Rubber Company, New York, N. Y., a corporation of New Jersey Application August 25, 1943, Serial No. 499,893

2 Claims. (Cl. 164—58)

This invention relates to a cutting device and in particular it relates to a cutting blade and holder therefor.

In the conventional use of cutting blades for cutting fabric and particularly for cutting rubberized or rubber coated fabric it is customary to provide a rigid cutting blade having a thickness in the order of $\frac{1}{16}$ of an inch. Such blades are made of high grade steel and the cutting edge is hand ground to present a keen cutting edge. The apparatus on which such cutting blades are used, for example in the tire industry, are referred to as bias cutters, good examples of which appear in the patent to Bolton No. 942,164 and the patent to Wegner No. 1,384,984. Rubberized or rubber coated fabric as used in the tire industry is formed of relatively heavy cords with the result that rapid cutting of this fabric presents a serious problem in maintaining a sufficiently sharp edge on the cutting blade. In many cases it has been found that only about 50 cuts can be made with one sharpening of the blade. This low cutting life exists regardless of the use of the best obtainable steels from which the blades are made. In their original cost, high grade steels for cutter blades are expensive, also such steels because of their tough character are difficult to sharpen.

I have found that substantial advancements can be secured in cutting operations by reducing the size of the cutting blade to a minimum and by providing a holder or support which will maintain the relatively flexible cutting blade in proper rigid position. I have also found that a greater number of cuts can be obtained from a blade which is relatively thin as compared with an inherently rigid blade such as used heretofore. Since in conventional bias cutters the cutting portion of the blade is limited to a fixed zone which is relatively small, I have found that by the use of a thin blade properly mounted in a holder it is possible to periodically shift the blade relative to the holder so as to present a new cutting edge. When such a blade has been shifted or moved outwardly in respect to the holder, the blade because it is relatively thin may be easily broken off where it protrudes so that the blade will not interfere with the cutting apparatus. By this arrangement it is possible to move a blade progressively outward relative to the holder and break off the used portion of the blade until substantially the complete length of the blade has been appropriated in service.

By using a relatively thin blade as thus described it has been found that a single position for a thin blade is capable of making upwards of 100 cuts across a length of fabric. By a single cut of a length of fabric is meant a cut for a distance of approximately 75 inches. A length of cutting blade as provided in my invention is approximately 1½ inches and the actual cutting zone is limited to approximately ⅛ inch. Therefore the blade may be shifted progressively about 10 times with the result that upwards of 1,000 cuts may be obtained from a single blade. In each case the used portion of the thin blade is broken off. It has been found considerably more economical to use up the thin blade in this manner than to resharpen the heavier type conventional blade. Furthermore, in the practice of my invention conventional razor blades may be used satisfactorily for this purpose.

It is therefore among the objects of my invention to provide a cutting device which is more economical than conventional cutting blades; to provide a cutting device which requires no resharpening of the blade; to provide a cutting device in which new areas of a cutting edge may be progressively moved to the cutting zone; to provide a cutting device in which the cutting blade is of such character that its used portion may be readily broken off; to provide a cutting device which will produce comparatively a greater number of cuts and which will provide cleaner or better cuts; and to provide a cutting device which will require less man hours to maintain and which will result in greater efficiency.

These and other objects and advantages will appear more fully in the following detailed description when considered in connection with the accompanying drawing in which.

Figure 1:
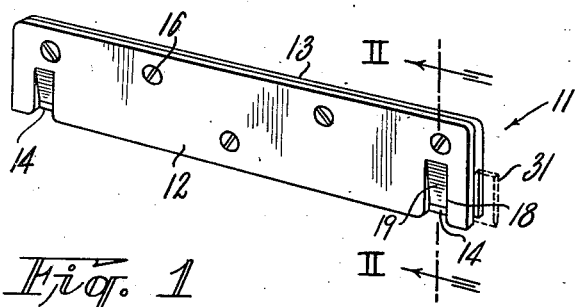
Fig. 1 is a perspective view of the cutting device of the present invention comprising a holder having a cutting blade at each end thereof.
Figure 2:
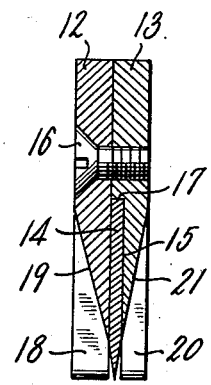
Fig. 2 is an enlarged transverse view, in section, taken along lines II—II of Fig. 1.
Figure 3:
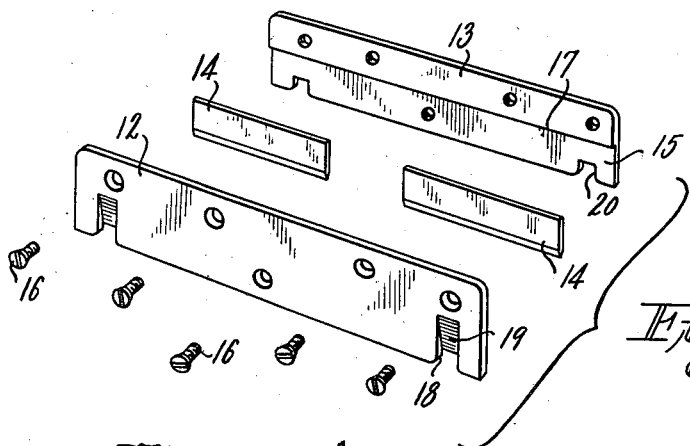
Fig. 3 is an exploded view in perspective illustrating the cutting blades and holder therefor; and, Fig. 4 is a portion of an apparatus, in section, illustrating the method of mounting the cutter holder, and its relative position to a sheet of fabric to be cut.

With reference to the drawing and in particular to Figs. 1, 2 and 3, I show a cutting device 11 of my invention comprising generally a pair of plates 12 and 13 and a cutting blade 14. The cutting device as illustrated in the drawing shows a holder constructed to support a cutting blade near each end of the holder. The purpose of this dual cutting arrangement is for convenience only since only one cutting edge is used at one time. Therefore while reference will be made to only one end of the cutting device it is to be understood that the same reference character may be interchangeable with a similar cutting portion at the opposite end of the cutting device.

The cutting blade 14 consists of a relatively thin and flexible blade having a cutting edge extending along one side thereof. The blade has a thickness of .010 inch, a length of 1½ inches and a width of 1/16 inch. Such a blade can be manufactured particularly for this purpose or if desired a conventional razor blade such as the "Schick" type may be used.

The plate 13 is provided with a slot 15 extending along its length for reception of the blade 14. The depth of the slot is somewhat less than the thickness of the blade 14 so that the blade is clamped tightly in position when the plates 12 and 13 are assembled. The slot 15 is also positioned in a manner so that when the plates 12 and 13 are assembled the slot 15 will form an opening along the length of the plates. Flat head machine screws 16 are used to clamp the plates 12 and 13 together. The slot 15 forms a shoulder 17 so that when the plates are clamped together the blade 14 is backed by the shoulder 17 and clamped between the plates 12 and 13 which completely house the blade. Near one end of the plate 12 or approximately ⅛ inch from the end is a slot 18 that is ⅛ inch in width and which extends inwardly about ⅛ inch from the side edge of the plate 12. From this point the slot 18 continues in the form of a tapered portion 19. A similar slot 20 and tapered portion 21 are formed at a corresponding location of the plate 13. By this arrangement the blade 14 when assembled with the plates 12 and 13 is exposed in the region of the slot 18 but is protected for the rest of its length, thus the relatively thin blade which would otherwise be incapable of support is adequately strengthened by the enclosing plates 12 and 13.

Figure 4:
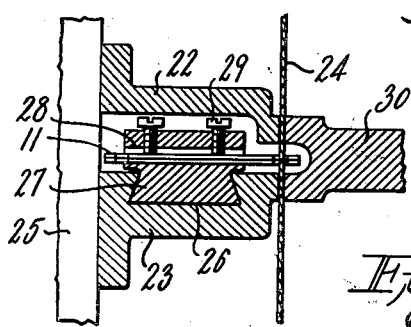

Fig. 4 illustrates a portion of a conventional bias cutting machine and shows the application of the cutting device in relative position with adjacent portions of the bias cutter. A pair of bar-like brackets 22 and 23 extend transversely or diagonally relative to a sheet of fabric 24. The brackets 22 and 23 are secured to the frame 25 or other structural portion of the bias cutter. The bracket 23 includes a dove-tail slide-way 26 for the reception of a slide block 27. The slide block is usually reciprocated by means of attaching cables and the block has a slot 28 in which is inserted the cutting device 11. A pair of machine screws 29 clamp the cutting device 11 in operating position upon the slide block 27. A bifurcated clamping arm 30 forming a part of the bias cutter is moveable against the fabric 24 so as to clamp the fabric tightly against the brackets 22 and 23 during the cutting cycle. It will be noted from this operation that only one narrow portion of the cutting blade is in serviceable position relative to the fabric 24. Consequently the blade is subjected to excessive localized wear. When the cutting device reaches the stage where it no longer produces a satisfactory cut it is merely necessary to remove the cutting device 11 from the block 27 and loosen the flat head machine screws 16. This permits the operator to engage a small tool into the slot 15 and slide the blade 14 outwardly so that a portion of the blade extends about ⅛ inch out of the plates 12 and 13 as indicated by the reference character 31 of Fig. 1. This portion of the blade may be readily broken off with a pair of pliers or other convenient tool and the cutting device may again be placed in position for additional use. This change of cutting edge and breaking of a portion of the blade may be continued until substantially the entire blade has been used up.

As thus shown and described it is believed apparent that I have provided a novel construction for increasing the efficiency of fabric cutting machines and while I have disclosed a preferred embodiment of the invention, it is to be understood that it is susceptible of obvious modifications as appearing within the spirit of the invention and as defined in the scope of the appended claims.

Having thus described my invention, what I claim and desire to protect by Letters Patent is:

1. A cutting device for slitting fabrics, comprising a slidably mounted block having clamping means for supporting a cutter holder, a bar-like cutter holder adapted to be clamped to said block in operating position and formed of two relatively long clamping plates having a blade receiving slot therebetween, a thin cutting blade having a cutting edge along one side and adapted to lie entirely in said slot so that it is clamped by said plates, and said plates having a transversely extending slot spaced from one end of the holder and extending inwardly from a side of the holder to expose a small portion of the cutting edge of the blade, whereby when the portion of the cutting edge thus exposed becomes dull the blade may be shifted in the slot to place a sharp cutting edge across the transversely extending slot.

2. A two end cutting device for slitting fabrics, comprising a slidably mounted block having clamping means for supporting a cutter holder with either of its ends in the fabric cutting position, a bar-like cutter holder formed of two relatively long clamping plates having a blade receiving slot therebetween adjacent each end of the holder, cutting blades adapted to be clamped in said slot near the opposite ends of the holder, and said plates having a transversely extending slot spaced from each end of the holder and extending inwardly from a side of the holder to expose a small portion of the cutting edge of the blade, whereby when the portion of a cutting edge thus exposed becomes dull the blade may be shifted in its slot or the holder may be turned end for end to place a sharp cutting edge in the fabric cutting position.

OSCAR L. BRIGHT.